United States Patent [19]

Desaintfuscien

[11] 4,158,785
[45] Jun. 19, 1979

[54] PULSE REGULATION DELAY LINE MODULATOR

[75] Inventor: Jean P. Desaintfuscien, Paris, France

[73] Assignee: Thomson-CSF, Paris, France

[21] Appl. No.: 839,382

[22] Filed: Oct. 4, 1977

[30] Foreign Application Priority Data

Oct. 5, 1976 [FR] France .................. 76 29894

[51] Int. Cl.² .............................. H03K 1/18
[52] U.S. Cl. ..................... 307/265; 307/246; 307/284; 307/268; 307/297; 328/65; 328/67
[58] Field of Search ............... 328/65, 67; 307/265, 307/268, 246, 247 R, 297, 268

[56] References Cited

U.S. PATENT DOCUMENTS

| | | | |
|---|---|---|---|
| 3,119,968 | 1/1964 | Schonberg | 328/67 |
| 3,139,585 | 6/1964 | Ross et al. | 328/65 |
| 3,333,120 | 7/1967 | Tomlin | 328/65 X |
| 3,363,184 | 1/1968 | Smith | 328/65 |

*Primary Examiner*—John S. Heyman
*Attorney, Agent, or Firm*—Cushman, Darby & Cushman

[57] ABSTRACT

A pulse regulation delay line modulator with a load circuit and a regulating circuit for the control of the delay line load voltage. The load circuit directly connected to a converter circuit is provided with a switchable fast locking circuit. The regulating circuit connected between the delay line input and inputs controlling the converter circuit and the switchable fast locking circuit allows on the one hand a control of the delay line load voltage by increments of elementary loading and on the other hand an almost instantaneous isolation of the delay line from converter circuit when the delay line is loaded without any big loss of energy.

3 Claims, 7 Drawing Figures

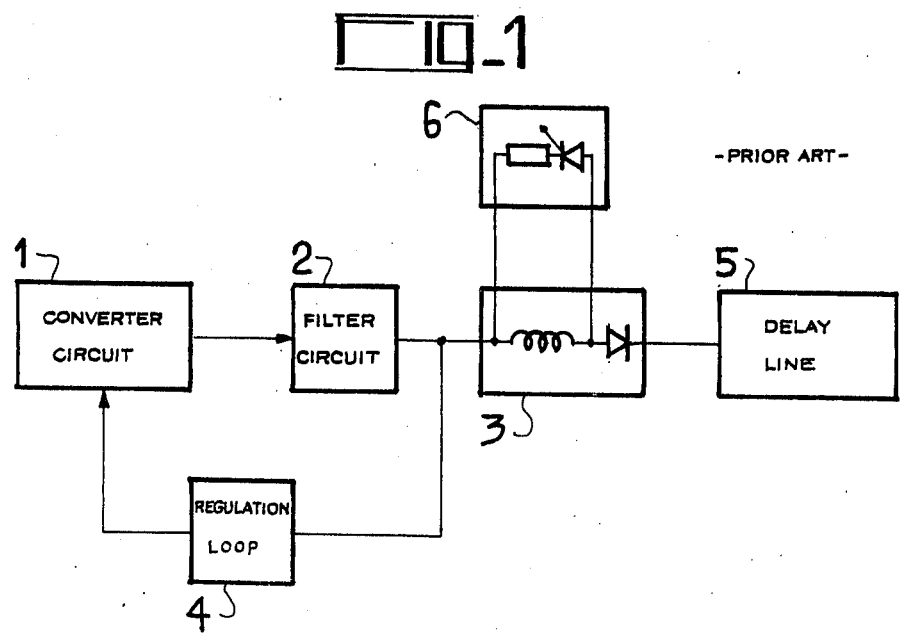
Fig. 1 — PRIOR ART —
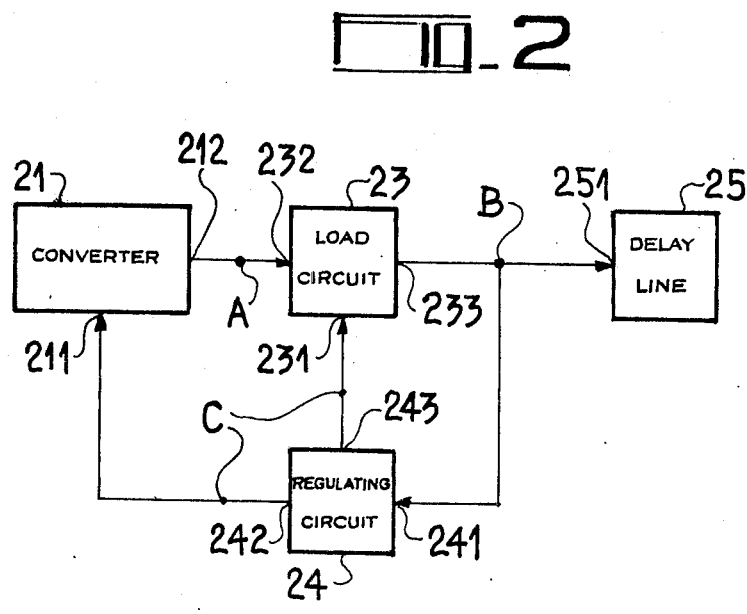
Fig. 2

FIG. 3
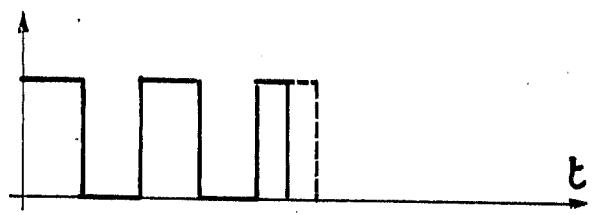
(a)
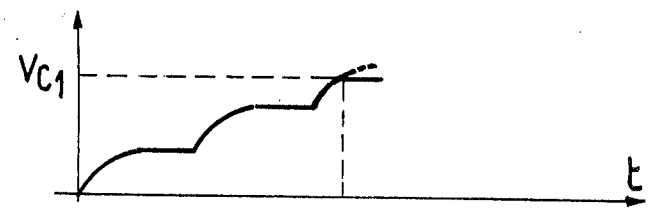
(b) $V_{C_1}$
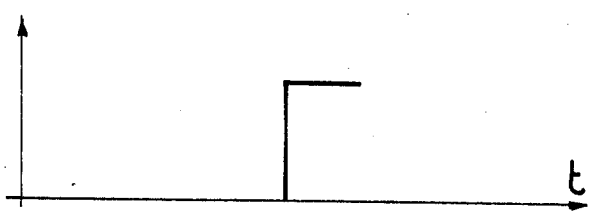
(c)
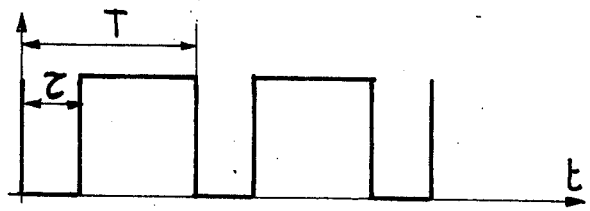
(d) $T$, $\tau$
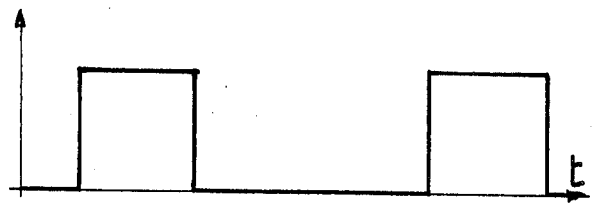
(e)
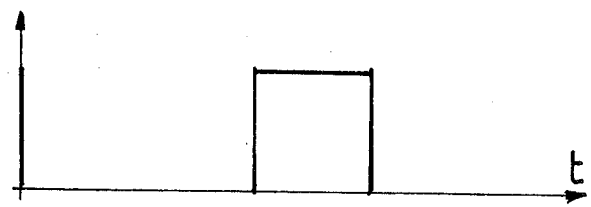
(f)

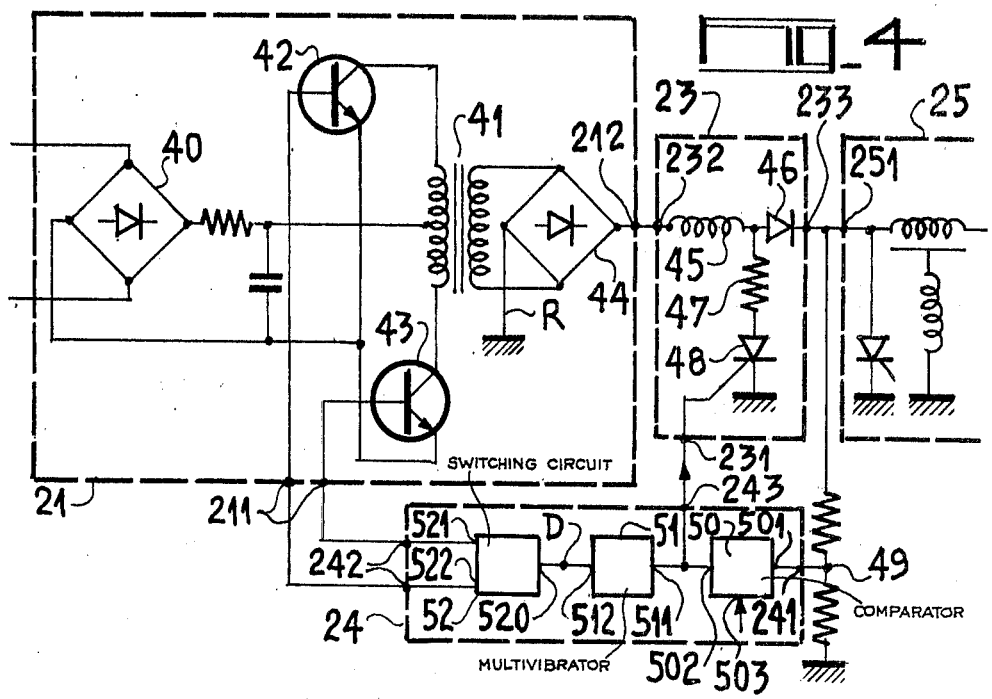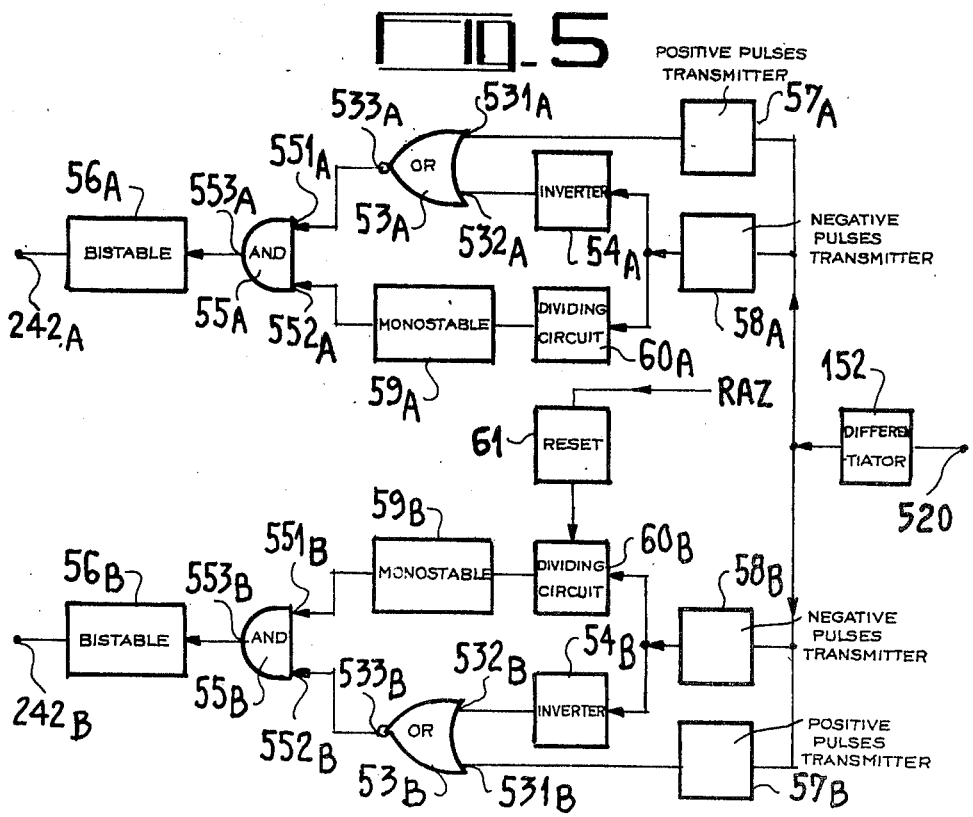

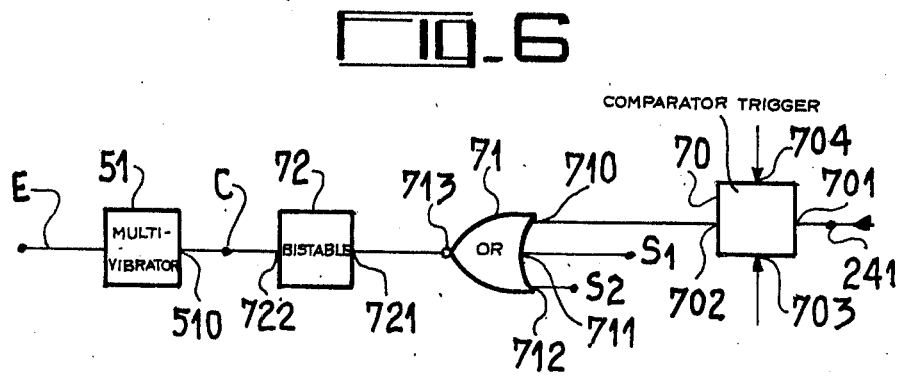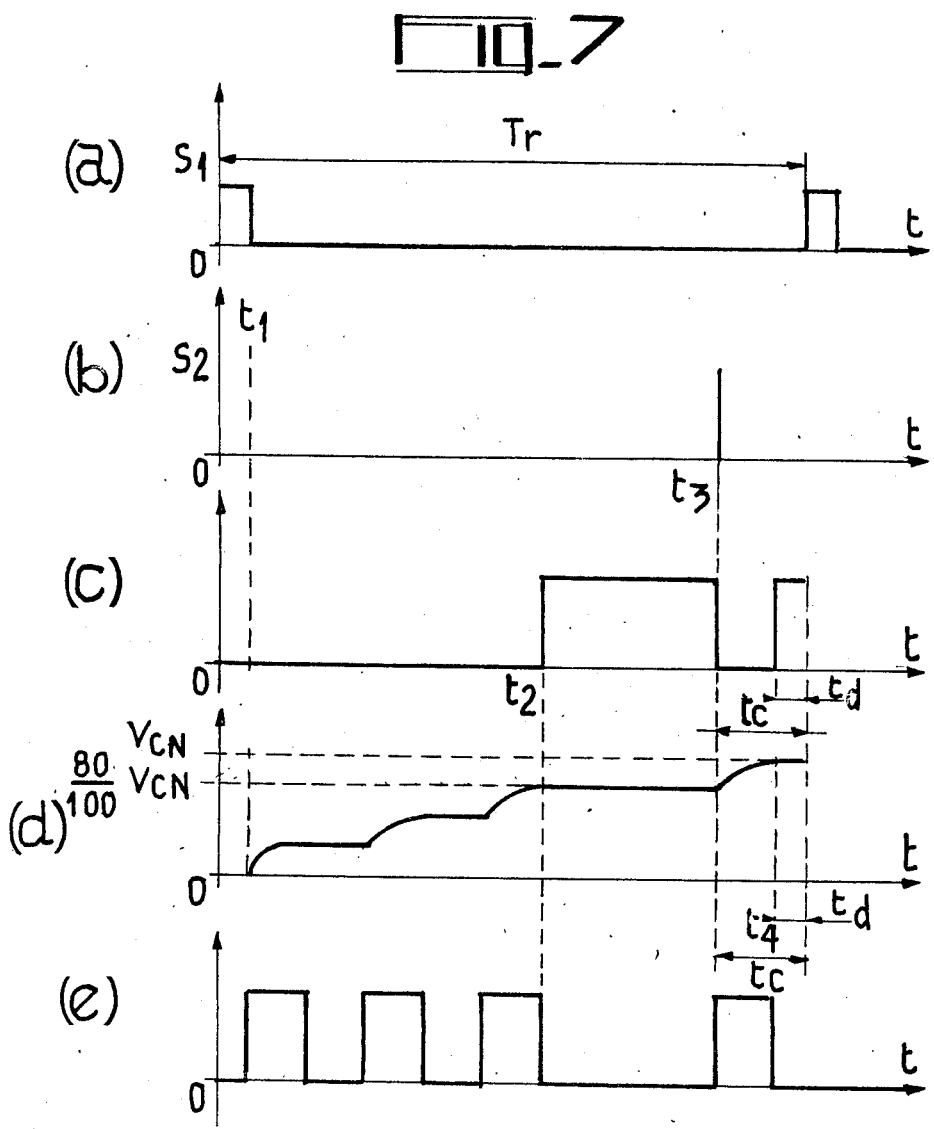

PULSE REGULATION DELAY LINE MODULATOR

The present invention concerns a pulse regulation delay line modulator for radars for example.

Standard delay line modulators fed by a high voltage source of the D.C.-A.C. converter type usually contain, in series with a converter circuit 1 as shown in FIG. 1, a filter circuit 2 and a load circuit 3 for delay line 5. A supply regulation loop 4 makes possible the enslaving of the delay line supply voltage to a predetermined value fixed for all the radar's transmitted pulses. For the regulation of the load voltage in delay line 5, these circuits require a second regulation circuit 6 which is able to operate for each pulse. This second regulation circuit 6 consists of a switchable damping circuit connected in parallel to the induction coil of load circuit 3 in the delay line. Such devices require the operation of two servo-control circuits for effective regulation of the load voltage in delay line 5 at the level of the pulses emitted on each synchronizing recurrence. These devices also cause a power consumption, which is not negligable, because of the damping of the induction coil in the load circuit.

One purpose of the present invention is the use of a modulator containing only one regulation circuit and giving an economy of equipment by simplification.

Another purpose of the invention is to cut out the energy loss caused by the damping of the induction coil in the load circuit.

A third purpose of the invention is the use of a device making it possible to reduce the load losses in the delay line to a minimum and correct the stability defect in the modulation pulses especially when they are emitted at a variable repetition frequency like the staggering emission process.

A modulator according to the invention is therefore a pulse regulation delay line modulator containing a high voltage D.C.-A.C. converter power supply, a load circuit and a regulating circuit controlling the load voltage in the delay line, the said load circuit being directly connected to the output of the converter circuit which contains a switchable fast locking circuit, the regulating circuit which controls the load voltage in the delay line by small increases of elementary loading being connected between the delay line input and the respective inputs controlling the converter and switching the fast locking circuit in the load circuit.

Such modulators are usable in particular in pulsed transmission radars, particle accelerators or laser emission devices.

The invention will be better understood from the description and drawings which follow in which the same references represent the same elements and where moreover FIG. 1 which represents the prior art.

FIG. 2 shows a general block diagram of a device in accordance with the invention;

FIG. 3 shows wave-forms obtained at different points in the device as in FIG. 2;

FIG. 4 shows a detailed schematic diagram of an embodiment of the invention complying with the schematic diagram in FIG. 2;

FIG. 5 shows a detailed embodiment of a special element in the device shown in FIG. 4;

FIG. 6 shows a detail in the use of a preferred embodiment of the invention and FIG. 7 shows wave-forms obtained at particular points in the preferred model shown in FIG. 6.

In accordance with FIG. 2, the modulator, which is the subject of the invention, contains a high voltage D.C.-A.C. converter power supply 21 connected to the input 251 of a delay line 25 through a load circuit containing a switchable locking circuit 23. A regulating circuit 24 has its input 241 connected to the input 251 of delay line 25. Regulating circuit 24 has its outputs 242 and 243 connected respectively to the converter control input 211 and the switching input 231 of the locking circuit in load circuit 23. Regulating circuit 24 makes possible regulation of the load voltage in the delay line at the level of each pulse.

Operation is as follows:

Converter circuit 21 delivers at its output 212 a voltage in the shape of rectangular signals. These signals, picked up at point A, are shown in FIG. 3a. They are applied to input 232 of load circuit 23. When control input 231 is not energized, load circuit 23 passes rectangular signals through its terminal 233 to input 251 of delay line 25. Delay line 25, acting as a capacitor, charges up on each pulse of the rectangular signal because of the unidirectional nature of the transmission in load circuit 23. The change in the voltage at point B of input 251 of delay line 25 is shown in FIG. 3b for a resistive load circuit. Each rectangular pulse corresponds to a load increment in delay line 25. When the load voltage in delay line 25 has reached a level corresponding to a reference or predetermined voltage $V_{c_1}$ produced by regulating circuit 24, output terminals 242 and 243 of circuit 24 deliver to terminals 211 and 231 respectively of the converter and load circuits a control signal whose effect is to cause converter circuit 21 to be cut off and load circuit 23 to be locked rapidly. The control signal picked up at point C is shown in FIG. 3c. The fast locking of load circit 23 causes a separation or almost instantaneous isolation of the delay line from converter circuit 21 without any big loss of energy and the delay line is loaded to a nominal voltage proportional to the predetermined voltage $V_{c_1}$ which is delivered by regulating circuit 24.

In accordance with FIG. 4, the modulator contains a high voltage, D.C.-A.C. converter circuit power supply 21 formed in classical manner by a rectifier circuit 40 connected to the main power supply and delivering a voltage, which is rectified and filtered at the primary winding of a centre-tap transformer 41. The primary winding terminals of transformer 41 are connected to the collectors of transistors 42 and 43 respectively, which are connected in opposition while their emitters are connected to the reference voltage terminal of the filter circuit. The secondary winding of transformer 41 is connected to a second rectifier circuit 44 producing a rectified voltage from the rectangular signals delivered by the converter circuit. The first output of rectifier circuit 44 is connected through 212 to input 232 of load circuit 23. Load circuit 23, which contains a switchable fast locking circuit, is formed by an induction coil 45 acting as doubler coil when the delay line is loading. Induction coil 45 has its input terminal connected to input terminal 232 of load circuit 23 and its output terminal connected in series with a diode 46. The output terminal of induction coil 45 is also connected to a clamping circit formed by a resistor 47 in series with a thyristor 48 whose free switching electrode is connected to the reference voltage fixed by the reference electrode R in the device while its control electrode is connected to switching input 231 of circuit 23. Diode 46 and the clamping circuit form the switchable fast locking circuit. Diode 46 is connected to output 233 of load circuit 23, the said output 233 of load circuit 25 being directly connected to input 251 of delay line 25. A divider 49 is connected to output 233 of circuit 23. The output of divider 49 is connected to input 241 of regulating circuit 24. Regulating circuit 24 contains a comparator circuit 50 with a triggering threshold whose control input 501 is connected to terminal 241 of circuit 24. The predetermined voltage $Vc_1$ is applied to input 503 of circuit 50. Comparator circuit 50 with a triggering threshold is, for example, a Schmitt trigger circuit whose triggering voltage is controlled by the predetermined voltage $Vc_1$, which allows the line load voltage to be adjusted. The triggering comparator circuit may also be formed by an logic circuit which delivers a triggering signal for a control voltage of the value of the predetermined voltage. Output 502 of circuit 50 is connected to the control input 511 of a multivibrator 51 and through terminal 243 to switching terminal 231 of load circuit 23. The signals delivered at the input 520 of a switching circuit 52 by the output 512 of multivibrator 51 and picked up at point D on FIG. 4 are shown in FIG. 3d. These signals are defined by the lengths T and $\tau$ of the period of the signals and of the length of the rectangular pulses delivered by multivibrator 51. The switching circuit is formed, for example, as shown in FIG. 5 by two series of circuits triggered by the rectangular signals delivered by multivibrator 51. These signals, which are differentiated in circuit 152, trigger the two channels A and B in the switchng circuit. Each channel contains, for example in channel A, a logic OR circuit 53A whose inputs 531A and 532A are fed respectively with the positive pulses delivered by differentiating circuit 152 and the circuit 57A and with the negative pulses delivered by the circuit 58A whose sign is changed by an inverter 54A. The output 533A of OR circuit 53A is connected to the input 551A of an AND logic circuit 55A. The input 552A of circuit 55A is fed with the negative pulses delivered by the differentiating circuit through a dividing by two circuit 60A which is connected in cascade with a monostable circuit 59A of time D such that $T+\tau<D<T+2\tau$. The output 553A of circuit 55A is connected to a bistable circuit 56A. Monostable circuit 59A of time D causes for one pulse in two the inhibiting of the triggering of bistable circuit 56A. The signals delivered by bistable circuits 56A and 56B are shown in FIGS. 3e and 3f. Bistable circuits 56A and 56B are thus only triggered for one pair in two of successive positive and negative pulses.

The second channel, or channel B, is similar to the first. In both cases, the dividing by two circuit may be a binary counter. For the second channel, when voltage is applied to the device and it is started up, a start-up reset pulse is applied to the counter 60B by 61 to shift it by one unit with respect to counter 60A in the first channel. Thus, the triggering of monostable circuit 59A only occurs for channel A after a delay equal to the period of the rectangular signals. Bistable circuits 56A and 56B deliver signals offset by one period. The signals delivered by bistable circuits 56A and 56B are applied respectively through terminals 522, 242 and 211 to the control electrodes of transistors 42 and 43 (FIG. 4). The cutting off of multivibrator 51 causes the switching of bistable circuits 56A and 56B and transistors 42 and 43 (FIG. 4). The simultaneous triggering of thyristor 48 has as a reult the almost instantaneous locking by diode 46 of the load circuit, the switching time of thyristor 48 being very short compared with that of conducting transistor 42 or 43. The resistor 47 in the clamping circuit then dissipates the storage energy of transistor 42 or 43 which was in conduction before. A device containing a switching circuit in which the cut-off voltage is only applied to the single conducting transistor 42 or 43 is not outside the scope of the present invention.

A preferred embodiment of the present invention makes it possible to optimize the instant at which the load voltage is reached in the delay line with respect to the instant the discharge of the delay line is triggered and the modulation pulse is emitted. The almost instantaneous locking of load circuit 23 in the device, which is the subject of the invention, makes possible the maximum reduction in the time interval separating the instant at which the line nominal load voltage is reached from the instant the modulation pulse is triggered. This optimizing allows a big reduction in the phenomenon of uncontrolled variable discharge of the delay line due to its electrical losses, losses which vary from one recurrence to another because of staggering. For this purpose regulating circuit 24 contains a delaying circuit for putting off loading of line 25. This circuit is triggered at the instant when the line load voltage has reached a given fraction of the nominal load voltage corresponding to predetermined voltage $Vc_1$.

Regulating circuit 24 contains as shown in FIG. 6 a double comparator trigger circuit 70 to which a second predetermined voltage $Vc_2$ is applied at an input 704, the first predetermined voltage $Vc_1$ being applied to an input 703 while input 701 receives the signal corresponding to the line load voltage Vc. Output 702 of circuit 70 is connected to the input 710 of an OR circuit 71. The inputs 711 and 712 of OR circuit 71 receive synchronizing signals $S_1$ and $S_2$ respectively, which are shown on FIGS. 7a and 7b where $S_1$ represents the transmission synchronizing signals, the instant $t_1$ the end of the modulation pulse measured from the origin 0 of a recurrence and the instant $t_3$ the instant at which signal pulse $S_2$ appears. The output 713 of circuit 71 is connected to the input 721 of a bistable circuit 72 whose output 722 is connected to the input 510 of multivibrator 51. FIG. 7c shows the signal picked up 7c point C in FIG. 6 and FIG. 7d the evolution of load voltage Vc in line 25 for a resistive load circuit. FIG. 7e shows the signal picked up at point E in FIG. 6. The cut-off of multivibrator 51 is obtained at instant $t_2$ by the tripping of bistable circuit 72. Multivibrator 51 remains cut off till instant $t_3$ when bistable circuit 72 changes state due to the appearance of pulse $S_2$. The new change of state in bistable circuit 72 at instant $t_4$ when the line load voltage reaches the nominal load voltage Vc cuts off multivibrator 51 again.

The time interval $t_4=Tr-t_3$ in which Tr is the radar signal recurrence period, the time interval separating the instant at which multivibrator 51 is opened up from the one when the modulation pulse is emitted, is chosen to enable the delay line to be loaded to its nominal load voltage. Also, the instant $t_3$ at which multivibrator 51 is opened up is so chosen that the trailing edge of the rectangular signal corresponding to the increment in delay line load which makes it possible to reach the line nominal load voltage VcN is such that the time interval $t_d$, which separates the said signal or rectangular pulse from the instant the modulation pulse is emitted, is equal to the switching time of thyristor 48 for example. Thus delay line 25 does not have time to discharge because of its losses. A pulse regulation, delay line modulator has thus been described which, with an economy of equipment, makes it possible to operate a device in which an improvemnt in the stability of the pulses is obtained especially during the emission of pulses under the process known as staggering.

What is claimed is:

1. A pulse regulation delay line modulator comprising a high voltage power supply converter circuit, a load circuit and a regulating circuit for the control of delay line load voltage, wherein said load circuit comprises a switchable fast locking circuit including an induction coil having an input coupled to said load circuit input and an output coupled to a diode and to a clamping circuit, said clamping circuit comprising a resistor coupled in series with a thyristor the free switching electrode of which is coupled to its potential reference, said thyristor having a control electrode coupled to a switching input of said load circuit, said regulating circuit further comprising:
   a comparator circuit having a triggering threshold, said comparator circuit having a control input coupled to an input of said regulating circuit and an output coupled to an input of said load circuit;
   a multivibrator having an input terminal coupled to said output of said comparator, said multivibrator having an output delivering rectangular signals; and
   a switching circuit having an input and two outputs, said input of said switching circuit being coupled to said output of said multivibrator and said two outputs of said switching circuit being coupled to said input controlling said converter circuit.

2. A pulse regulation delay line modulator including a high voltage power supply converter circuit, a load circuit and a regulating circuit for the control of the delay line load voltage wherein said regulating circuit comprises:
   a comparator circuit having a triggering threshold, said comparator circuit including a control input coupled to an input of said regulating circuit and an output coupled to an input of said load circuit;
   a multivibrator having an input coupled to said output of said comparator, said multivibrator having an output delivering rectangular signals; and
   a switching circuit having an input and two outputs, said input of said switching circuit being coupled to said output of said multivibrator and said two outputs of said switching circuit being coupled to said input controlling said converter unit, said switching circuit further comprising:
   a differentiator feeding two channels A and B, each of which includes an OR logic circuit having two inputs respectively fed with positive pulses and with negative pulses delivered by said differentiator, said OR logic circuit having an output;
   an AND logic circuit having two inputs and an output, said output of said OR logic circuit being coupled to one of said inputs of said AND logic circuit, said other input of said AND logic circuit being coupled to said differentiator via a dividing circuit and a monostable, said monostable having a time D such that $T+\tau < D < T+2\tau$ in which T and $\tau$ represent the period and the length respectively of rectangular pulses delivered by said multivibrator; and
   a bistable circuit having a control input and two outputs, said input of said bistable circuit being coupled to said output of said AND logic circuit and said two outputs of said bistable circuit being coupled to said two outputs of said switching circuit.

3. A pulse regulation delay line modulator including a high voltage power supply converter circuit, a load circuit and a regulating circuit for the control of the load voltage of said delay line wherein said regulating circuit comprises:
   a comparator circuit having a triggering threshold, said comparator circuit including a control input coupled to an input of said regulating circuit and an output coupled to an input of said load circuit;
   a multivibrator having an input coupled to said output of said comparator, said multivibrator having an output delivering rectangular signals; and
   a switching circuit having an input and two outputs, said input of said switching circuit being coupled to said output of said multivibrator and said two outputs of said multivibrator and said two outputs of said switching circuit being coupled to said input controlling said converter unit, said regulating circuit further comprising a loading delaying circuit for delaying of the loading of said delay line, said delaying circuit being triggered in operation when the line load voltage reaches a prearranged fraction of the nominal load voltage, said loading delaying circuit further comprising:
   a double threshold trigger comparator having three inputs and one output, said inputs receiving respectively a signal corresponding to the load voltage of said delay line and to two predetermined voltage levels corresponding to the two triggering thresholds of said trigger comparator; and
   an OR logic circuit and a bistable, said OR logic circuit having three inputs and an output and said bistable having an input and an output, a first input of said OR logic circuit being coupled to said output of said trigger comparator and said second and third inputs of said OR logic circuit receiving respectively two synchronizing signals, said output of said OR logic circuit being coupled to said input of said bistable and said output of said bistable being coupled to said input of said multivibrator.

* * * * *